Aug. 17, 1937.  G. A. LYON  2,089,972
PROCESS OF MAKING WHEEL DISKS
Filed Jan. 15, 1936    3 Sheets-Sheet 1
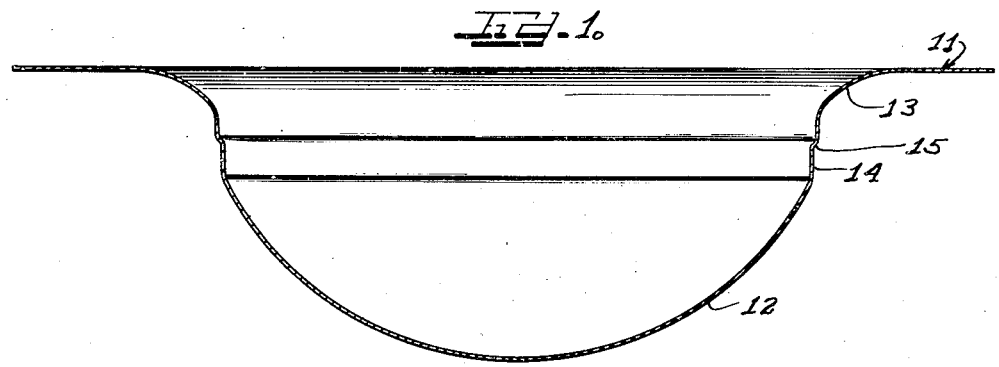
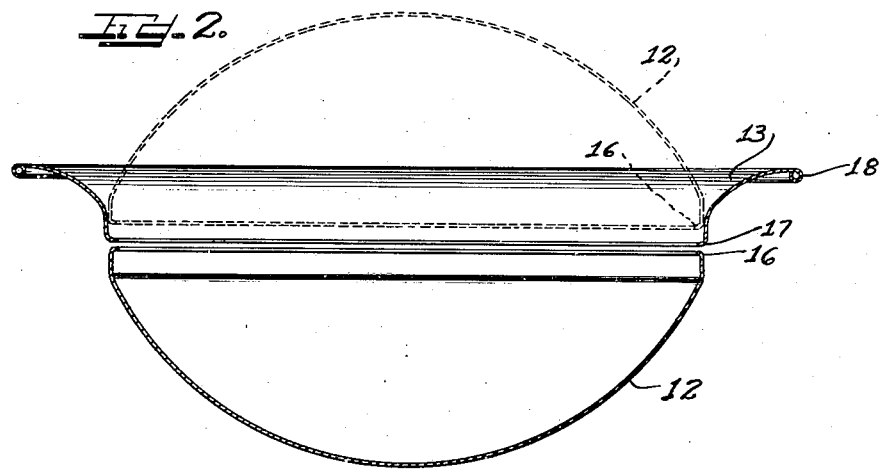
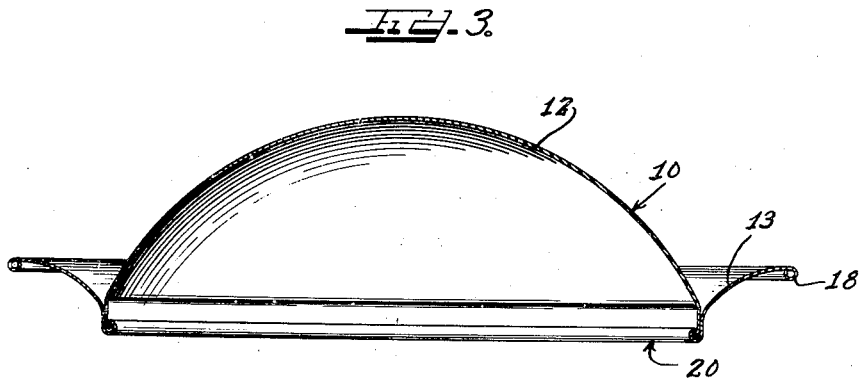
Inventor
George Albert Lyon.
by Charles W. Hill Attys.

Aug. 17, 1937. G. A. LYON 2,089,972
PROCESS OF MAKING WHEEL DISKS
Filed Jan. 15, 1936 3 Sheets-Sheet 2
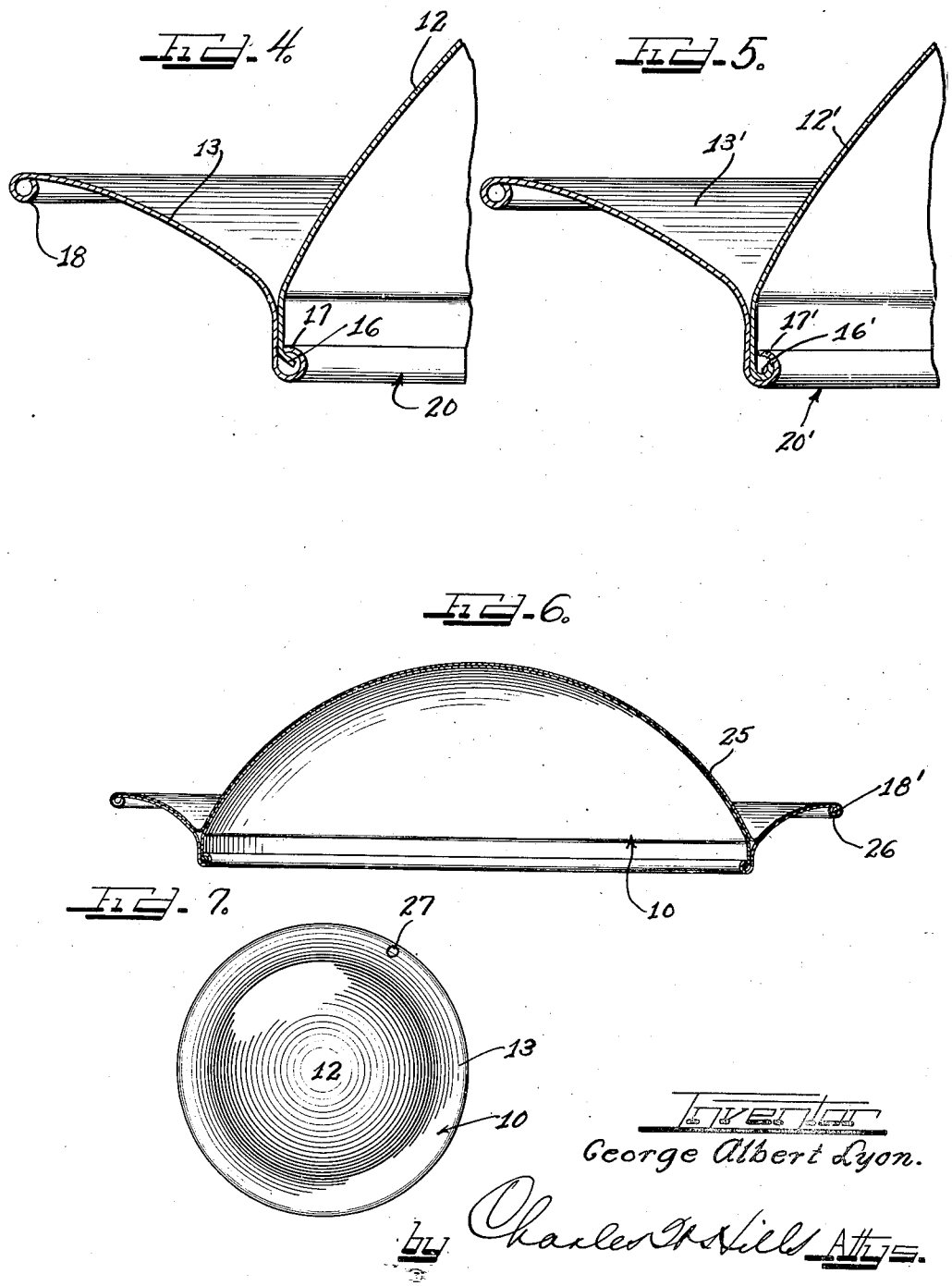

Aug. 17, 1937.  G. A. LYON  2,089,972
PROCESS OF MAKING WHEEL DISKS
Filed Jan. 15, 1936   3 Sheets-Sheet 3
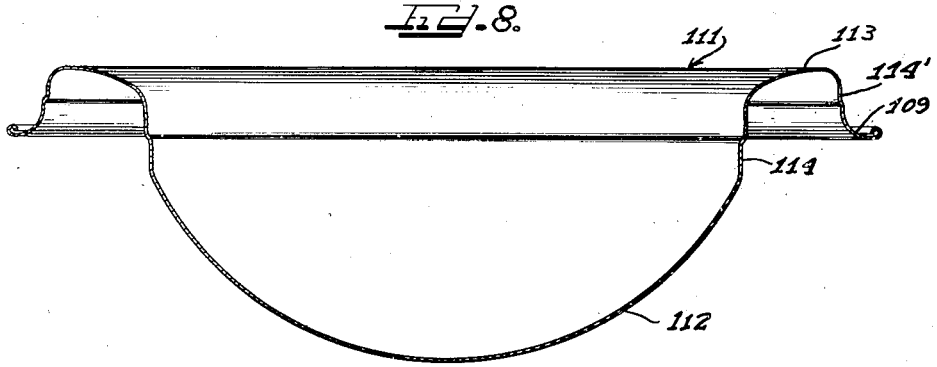
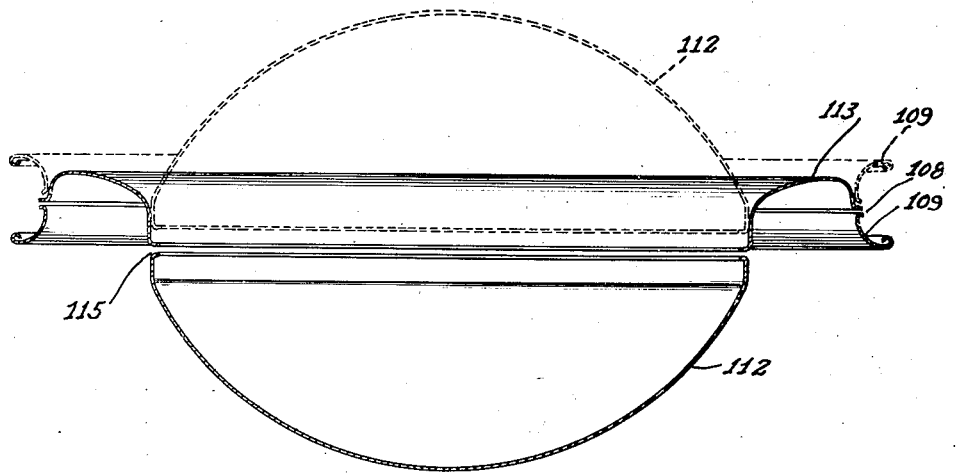
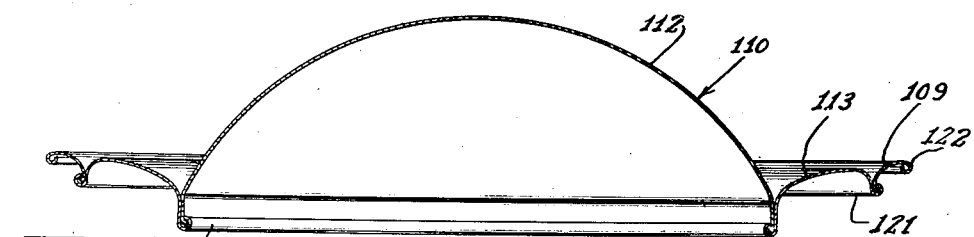
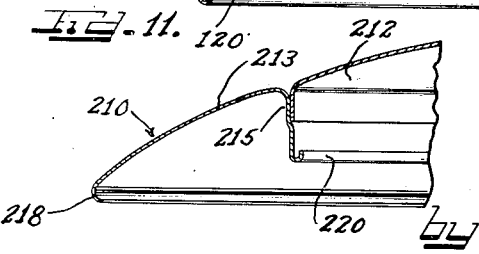
Inventor
George Albert Lyon.
by Charles Patented Aug. 17, 1937

2,089,972

UNITED STATES PATENT OFFICE 2,089,972

PROCESS OF MAKING WHEEL DISKS

George Albert Lyon, Detroit, Mich.

Application January 15, 1936, Serial No. 59,275

14 Claims. (Cl. 113—116)

This invention relates to a process of making an ornamental disk, and more particularly to a novel process of making a centrally bulged wheel disk adapted to be used in place of a hub cap on an automotive vehicle.

An object of this invention is to provide a novel process of making a disk or annulus having a centrally bulged part and an inwardly depressed outer ring whereby the exterior surfaces of these parts can be given a high grade finish without leaving a roughened or unfinished section at the junction of the ring and central part.

Another object of this invention is to provide a simplified process of manufacturing a wheel disk which enables the components of the disk to be fabricated from a single piece of metallic sheet in such a way that the exterior surfaces of these parts can be suitably finished before such parts are interconnected.

A still further object of this invention is to provide a novel process of manufacturing wheel disks or the like whereby a central bulged part of the disk can be secured to an outer ring part in such a manner that these parts have their exterior surfaces facing each other so that light rays can be reflected from one surface to the other, and vice versa.

Another and further object of this invention is to provide a method of manufacturing a wheel disk whereby component central and outer ring parts can be blanked from a single sheet of material, reversed in position, and later secured together in such a manner as to provide an intermediate annular rib for use in the retention of the disk on an object, such as a wheel or the like.

In accordance with the general features of this invention, there is provided a process for making an ornamental disk which consists in blanking from a metallic sheet or the like an annulus including a central crown part and an annular outer ring of curved transverse cross section, severing the crown part from the outer ring, reversing the position of the part to the ring, nesting the part in the ring, and securing the edge of the part to the inner edge of the ring by rolling one edge about the other, whereby an intermediate annular ridge-like bead is provided at the rear of the disk.

In accordance with the features of my invention, the inner edge of one of the two component parts of the disk may be turned about the other, or both edges may be turned together, with one edge inside the other, by a press operation.

A still further feature of the invention relates to the manner in which the parts are severed, whereby the cut edges are turned inwardly and are adapted to nest one within the other after the parts are reversed and the central part is disposed inside of the outer ring part.

Another and still further object of the invention relates to the feature of providing an independent outer shell for the fabricated disk, which shell may be highly ornamented, and is secured to the disk proper by the simple operation of pressing it to shape on the disk and by rolling its outer edge around the outer edge of the disk.

Other objects and features of this invention will more fully appear from the following detailed description, taken in connection with the accompanying drawings, which illustrate several embodiments thereof, and in which:

Figure 1 is a view illustrating the first step in the process of making my wheel disk, namely, the step of blanking or drawing the crown and ring parts from a metallic sheet;

Figure 2 is a view illustrating other steps of the process, and showing more particularly the steps of severing the parts, rolling the outer edge of the ring apart, and nesting the central or crown part inside of the ring part, the crown part in its reversed position being shown in dotted lines;

Figure 3 is a cross-sectional view through a disk fabricated in accordance with the present process;

Figure 4 is an enlarged fragmentary sectional view corresponding to a portion of Figure 3, and illustrating the manner in which the edges of the two parts of the disk are rolled together when the edge of one part is rolled about the edge of the other;

Figure 5 is a sectional view similar to Figure 4, but differing therefrom in that it illustrates the use of a slightly different method of securing the two edges of the component parts of the disk together;

Figure 6 is a cross-sectional view through a modified form of disk showing the disk having applied thereto an ornamental outer shell;

Figure 7 is a front view of the disk shown in section in Figure 3;

Figure 8 is a sectional view taken through a blank illustrating a step in the process of manufacturing a modified disk;

Figure 9 is a sectional view illustrating further steps in the process of manufacturing this modified disk which embodies three components instead of two;

Figure 10 is a cross-sectional view through the disk made in accordance with the steps illustrated in Figures 8 and 9; and Figure 11 is a fragmentary sectional view illustrating a step in a further modified process of making the disk.

On the drawings:

The reference character 11 designates generally a sheet of suitable material, such for example as metallic sheet, from which the disk 10 (Fig. 3) of my invention is fabricated. It is submitted that my process of manufacture can be readily understood from a description of the component parts of the disk and the manner in which they are formed and assembled.

The metallic sheet is held in a suitable press or other equipment, and may be either square or round, as desired. This sheet is then subjected to a pressing operation whereby a crown or central part 12 and an annular ring part 13 are depressed therefrom, as shown in Figure 1. These parts are connected by an intermediate annular rib 14 having an inclined edge 15 which reduces the diameter of the inner margin of the central part 12 to enable the same to be nested in the ring part when the central part is severed from the ring part and its position is reversed with respect thereto.

The crown part 12 is of a generally hemispherical shape, and the part 13 has a transversely curved cross section.

As shown in Figure 2, these two parts are adapted to be severed, and the cut edges are turned as indicated at 16 and 17. The central part is then reversed in position with reference to the ring part, or in other words, is disposed in the dotted line position shown in Figure 2. In this position, the turned edge 16 is nested inside of the inner margin of the ring part 13, and is adapted to be pressed, in a die having spring pads, into a secured connection with the edge 17.

The parts are thereafter subjected to pressure in a press whereby the turned edge 16 of the part 12 is wedgingly forced into tight nested relation with the inner margin of the ring part 13, this edge then being located over the edge 17.

Thereafter, the edge 17 may be turned about the edge 16, as shown in Figure 4, to interconnect the two parts. When a press operation is used to effect this interconnection of the edges, the edge 17 is forced to follow a curved path and into the die so that it is curled upwardly about and around the edge 16 as the ring part 13 is pressed into position about the central part 12, provision being made in the die for this operation by an annular groove having a shape and diameter corresponding to that of the rolled edge desired. In lieu of this operation, both of the edges 16' and 17' of the parts 12' and 13' respectively may be curled one within the other, as shown in Figure 5, thereby providing an inner rolled edge 20'. This turning step is also adapted to be performed in a press.

When the step illustrated in Figure 4 is employed for securing the edges together, the inner edge or margin 17 of the ring part 13 is rolled upwardly and into the interior of the central part 12, and into a tight fit with the turned edge 16 of the part 12, thereby providing an annular intermediate bear or ridge 20. This bead or ridge 20 or 20' is adapted to cooperate with any suitable retaining or gripping means, such for example as spring elements on a wheel, for securing the disk to the wheel or other object. When the disk is used as a wheel disk, it is snapped into retaining engagement with such gripping elements.

Also, the outer edge of the ring part 13 may be rolled as indicated at 18 so as to prevent it from having a cutting edge.

In the event that it is not desired to finish the exterior surfaces of the disk, the disk may be provided with an exterior ornamental shell by pressing a sheet of suitable material over the outer surface of the disk, using the disk as a die member. In that event, the sheet that is pressed on the disk is caused to assume the same configuration as the outer configuration of the disk, and may be secured on the disk by any suitable means. In Figure 6 I have illustrated such a shell 25 applied to the wheel disk 10, which disk is similar to the one previously described, and which shell has its outer edge 26 rolled about the outer edge 18' of the disk so as to retain the shell in position on the disk. This shell may be made of stainless steel, in which event it will not require any plating or other coating, but may be used with the natural finish of the stainless steel.

In Figure 7, I have illustrated a front view of the disk showing the disk as being provided with an aperture 27 for accommodating a valve stem, in the event that it is desired to have the valve stem on a vehicle wheel accessible from the exterior of the disk. In this figure, as well as in Figures 3 and 6, I have designated the disk generally by the reference numeral 10.

By reason of the configuration and relative arrangement of the parts 12 and 13, they will, if provided with a lustrous finish, reflect light rays from each other, thereby greatly enhancing the ornamental appearance of the disk.

Also, the process I have invented is highly desirable in that the parts 12 and 13 may be separately buffed and finished after they have been severed and prior to their being secured together in the manner described in connection with either Figure 4 or Figure 5.

In Figures 8, 9 and 10, I have illustrated a modified form of my invention, wherein the disk 110 is made up of three components instead of two, namely, a central part 112, a ring part 113 and a bead part 109. These three parts are formed from a sheet of metal which is initially pressed into the shape designated generally by the reference character 111 in Figure 8. The three portions of this blank 111 which are to be made into the three parts noted hereinabove are also designated by the reference characters assigned to these parts, namely, numerals 109, 112 and 113. In order to provide for the nesting of these parts, and also to define the points of application of the cutting tool, the blank 111 is provided with annular depressed sections 114 and 114'. The depressed section 114 is disposed between the ring part 113 and the central part 112, and the depressed section 114' is disposed between the ring part 113 and the bead part 109.

As shown in Figure 9, the next steps in the process of making this three-piece disk consist in the severing of the parts and in the reversing of the position of the two parts 112 and 109 with reference to the ring part 113. The part 112 is cut by any suitable equipment at 115 from the part 113, thereby providing turned edges like the edges 16 and 17 previously described. The part 109 is cut as indicated at 108 from the part 113, this cutting operation providing these two parts with outwardly turned edges, as clearly shown in Figure 9.

The parts 112 and 109 are thereafter turned over from the full line positions shown in Figure 9 to the dotted line positions shown in that same figure.

The nested and turned edges of the parts 112 and 113 are then interconnected by curling one edge about the other to form an annular ridge or bead 120 similar to the bead 20 previously described. Similarly, the nested turned edges of the parts 113 and 109 are interconnected by curling one about the other to provide a turned edge 121. The outer edge of the bead part 109 may be turned as indicated at 122 to provide a smooth edge for the disk.

This three part disk is advantageous in that after the parts have been severed from the common annulus, they may be each separately finished as desired, without the necessity of having to buff or plate any depressed surfaces, as would be true if the disk were finished while in the condition of a single unit.

Then, too, this three part disk lends itself admirably to the formation of color contrasts in the disk. For example, the ring part 113 could be finished in a color, and the parts 112 and 109 could have a lustrous finish such as is obtained by chromium plating such parts. After the parts have been thus finished, they can be assembled and interconnected in a press as aforesaid. In making this interconnection in a press, chamois covered die parts can be employed so as to prevent marring of the finished surfaces.

In Figure 11, I have illustrated a still further modification of the invention, wherein the central and ring parts 212 and 213 of a disk 210 have a different shape and contour, these parts, however, being blanked from a single sheet in the same way that the parts illustrated in Figures 1 and 2 are fabricated. The part 212, after it has been reversed with reference to the part 213, is connected to the part 213 by a pressed fit, as indicated at 215. It will be noted that in this form the inner margin of part 213 extends beyond the inner margin of the part 212, and has its edge curled as indicated at 220. The interconnected and nested portions of these two parts may be subjected to a welding operation, if desired, so as to augment the securement of the parts together. Also, the outer edge of the part 213 may be curled as indicated at 216 to provide the disk with a smooth outer edge.

From the foregoing, it is apparent that not only is the problem of buffing and finishing the disk simplified in my process of manufacture, but in addition thereto the disk can be made at a low cost, from either stainless steel, brass to be plated, or other rust-resisting materials.

Moreover, in the event the parts of the joints are interconnected by a pressed fit without welding, any desirable combination of metals can be used in these parts. Obviously, the elimination of the step of welding simplifies the manufacture of the disk and reduces the cost of manufacture.

The parts, by reason of their nested and pressed fit, are self-aligning and -centering, and afford the disk an appearance consistent with the modern appointments of automotive vehicles.

An additional advantage of my invention resides in the fact that the step which I employ for interconnecting the parts provides for an inner projecting bead or ring for cooperation with the disk retaining springs on the wheel of an automobile, without necessitating the use of a separate ring or skirt for this purpose. Also, by reason of the double thickness of metal at the place of interconnection of the parts, and especially at the point of application of the spring pressure for retaining the disk on the wheel, the disk is given strength where it is subject to the greatest stress in use.

Of course, it is to be understood that while I have described the interconnection of the edges as being effected in a press, the curling and rolling operations could be carried out by other equipment, such for example as by rolls so arranged as to curl an edge of one part about an edge of the other. The performance of this step in a press, however, particularly where the disks are being made on a production basis, would be cheaper than rolling the edges together by separate equipment. Where the disk is produced on a jobbing basis, the process of my invention could, of course, be carried out by spinning operations.

I am aware that many changes may be made and numerous details of the process may be varied through a wide range without departing from the principles of this invention, and I, therefore, do not purpose limiting the patent granted hereon otherwise than necessitated by the prior art.

I claim as my invention:

1. The process of making a wheel disk which consists in blanking from a metallic sheet an annulus including a central crown part and an annular outer ring, severing the crown part from said outer ring, reversing the position of said part to said ring, nesting the crown part in said ring, and securing the edge of said part to the inner edge of said ring.

2. The process of making a wheel disk which consists in blanking from a metallic sheet an annulus including a central crown part and an annular outer ring, severing the crown part from said outer ring, reversing the position of said part to said ring, nesting the crown part in said ring, and securing the edge of said part to the inner edge of said ring by rolling said edges one within the other.

3. The process of making a wheel disk which consists in blanking from a metallic sheet an annulus including a central crown part and an annular outer ring, severing the crown part from said outer ring, reversing the position of said part to said ring, nesting the crown part in said ring, and securing the edge of said part to the inner edge of said ring by rolling one of said edges about the other edge.

4. The process of making a wheel disk which consists in blanking from a metallic sheet an annulus including a central crown part and an annular outer ring, severing the crown part from said outer ring, reversing the position of said part to said ring, nesting the crown part in said ring, securing the edge of said part to the inner edge of said ring, and securing over the exterior surface of said part a decorative shell having a configuration conforming to that of said exterior surface.

5. The process of making a wheel disk which consists in blanking from a metallic sheet an annulus including a central crown part and an annular outer ring, severing the crown part from said outer ring, reversing the position of said part to said ring, nesting the crown part in said ring, securing the edge of said part to the inner edge of said ring, and securing over the exterior surface of said part a decorative shell having a configuration conforming to that of said exterior surface by rolling the outer edge of said shell about the outer edge of said annulus.

6. The process of making a wheel disk which consists in blanking from a sheet of suitable material an annulus including a circular central bulged part and an annular outer ring of curved transverse cross section, severing the central part from the outer ring, reversing the position of said part to said ring, and securing the edge of said part to the inner edge of said ring.

7. The process of making an ornamental disk which consists in blanking from a sheet of suitable material an annulus including a central bulged part of convexo-concave cross section and an outer ring, severing the central part from said ring, reversing the position of said part so as to dispose the edge of said central part inside of the ring and securing said edge to said ring.

8. The process of making an ornamental disk which consists in blanking from a sheet of suitable material an annulus including a central bulged part of convexo-concave cross section and an outer ring, severing the central part from said ring, reversing the position of said part so as to dispose the edge of said central part inside of the inner edge of said ring, and securing said edges together by rolling one edge about the other to provide an annular concealed rib adapted to cooperate with retaining means for holding the disk in place on an object.

9. The process of making an ornamental disk which consists in blanking from a sheet of suitable material an annulus including a central bulged part and an annular outer ring, severing the crown part from the ring, reversing the position of the part and ring, wedgingly nesting the edge of said central part inside of the inner margin of said ring, and securing said edge to said margin.

10. The process of making an ornamental disk which consists in blanking from a sheet of suitable material an annulus including a central bulged part and an outer annular ring, severing the crown part from said ring, turning the cut edges of said part and ring inwardly, reversing the position of said part to said ring, disposing the central part in said ring with the turned edge of the central part nested over the turned edge of the ring, and securing said edges together.

11. The process of making an ornamental disk which consists in blanking from a sheet of suitable material an annulus including a central bulged part and an outer annular ring, severing the crown part from said ring, turning the cut edges of said part and ring inwardly, reversing the position of said part to said ring, disposing the central part in said ring with the turned edge of the central part nested over the turned edge of the ring, and securing said edges together by rolling one turned edge about the other turned edge.

12. The process of making an ornamental disk which consists in blanking from a metallic sheet an annulus including a central part, an intermediate annular ring part, and an outer bead part, severing the parts from each other, reversing the positions of the central and outer parts with reference to the intermediate part so that the central part is disposed inside of the intermediate part and the outer ring is nested over the outer edge of the intermediate part, and securing the edges of said parts together.

13. The process of making an ornamental disk which consists in blanking from a metallic sheet an annulus including a central part, an intermediate annular ring part, and an outer bead part, severing the parts from each other, reversing the positions of the central and outer parts with reference to the intermediate part so that the central part is disposed inside of the intermediate part and the outer ring is nested over the outer edge of the intermediate part, and securing the edges of said parts together by curling the edges of the parts together.

14. The process of making an ornamental disk which consists in blanking from a metallic sheet an annulus including a central part, an intermediate annular ring part, and an outer bead part, severing the parts from each other, turning the cut edges of said parts, reversing the positions of the central and outer parts with reference to the intermediate part so that the central part is disposed inside of the intermediate part and the outer ring is nested over the outer edge of the intermediate part, and securing the edges of said parts together by curling certain of said turned edges about other turned edges.

GEORGE ALBERT LYON.